United States Patent
Ng et al.

(10) Patent No.: US 11,630,715 B2
(45) Date of Patent: Apr. 18, 2023

(54) METHOD AND SYSTEM FOR RECORDING AND LOGGING ERROR HANDLING INFORMATION

(71) Applicants: Advanced Micro Devices, Inc., Santa Clara, CA (US); ATI Technologies ULC, Markham (CA)

(72) Inventors: Philip Ng, Markham (CA); Buheng Xu, Shanghai (CN)

(73) Assignees: ADVANCED MICRO DEVICES, INC., Santa Clara, CA (US); ATI TECHNOLOGIES ULC, Markham (CA)

(*) Notice: Subject to any disclaimer, the term of this patent is extended or adjusted under 35 U.S.C. 154(b) by 0 days.

(21) Appl. No.: 17/131,512

(22) Filed: Dec. 22, 2020

(65) Prior Publication Data
US 2022/0188180 A1 Jun. 16, 2022

(30) Foreign Application Priority Data
Dec. 15, 2020 (CN) .......................... 202011473487.7

(51) Int. Cl.
G06F 11/07 (2006.01)
G06F 13/38 (2006.01)
G06F 9/46 (2006.01)

(52) U.S. Cl.
CPC .......... *G06F 11/0781* (2013.01); *G06F 9/466* (2013.01); *G06F 13/385* (2013.01); *G06F 2213/0026* (2013.01)

(58) Field of Classification Search
CPC ................................................... G06F 11/0766
See application file for complete search history.

(56) References Cited

U.S. PATENT DOCUMENTS

2004/0030957 A1* 2/2004 Yadavalli .............. G06F 11/073
714/E11.004
2012/0198174 A1* 8/2012 Nellans ................. G06F 3/0655
711/E12.009

* cited by examiner

*Primary Examiner* — David E Martinez
(74) *Attorney, Agent, or Firm* — Volpe Koenig

(57) ABSTRACT

A method and system for recording and logging errors in a computer system includes reading first error handling information with respect to a transaction. The first error handling information is stored in a first component, and based upon a condition of the storage in the first component, an oldest error information is evicted from the first component.

14 Claims, 3 Drawing Sheets

METHOD AND SYSTEM FOR RECORDING AND LOGGING ERROR HANDLING INFORMATION

CROSS REFERENCE TO RELATED APPLICATION

This application claims priority to Chinese Patent Application No. 202011473487.7, filed Dec. 15, 2020, the entire contents of which is hereby incorporated by reference as if fully set forth herein.

BACKGROUND

In existing systems, peripheral component interconnect express (PCIe) components record detailed error handling information associated with outstanding PCIe transactions. The error handling information, which can include packet headers or packets themselves, such as Transaction Layer Packet (TLP) headers, TLP prefixes, and implementation specific metadata, is recorded "in hardware" using respective error recording circuitry. As the bandwidth of PCIe links increases, there are a greater number of outstanding PCIe transactions, causing the number of PCIe headers to grow larger, (e.g., as information is added to headers in each passing generation of the PCIe specification/implementation), and as more PCIe ports are become available, the amount of error handling information increases. This leads to a demand for more semiconductor layout area for the error handling information storage circuitry, as well as requiring the consumption of more electrical power in circuitry that is already constrained with regard to both semiconductor layout area and electrical power consumption.

BRIEF DESCRIPTION OF THE DRAWINGS

A more detailed understanding can be had from the following description, given by way of example in conjunction with the accompanying drawings wherein.

DETAILED DESCRIPTION

Although the method and system will be expanded upon in further detail below, briefly a method for and system for recording and logging error handling information is described herein.

The error handling information recording and logging includes maintaining error handling information at different resolutions or degrees of complexity for transactions based on an age (or other characteristic) of the transactions. For example, some characteristics may include whether a transaction is posted or unposted, the traffic class or whether the transaction is on a virtual channel.

Generally, full or typical error handling information is initially kept for active/in-flight transactions, with the error handling information being incrementally/gradually reduced in resolution or complexity as the active/in-flight transactions age (possibly for certain subsets of transactions). For example, error handling information that is less critical for, or likely to be dispositive for identifying errors can be kept in the full error handling information for younger transactions, but eventually dropped for reducing the complexity/resolution of the error handling information as the transactions age.

Error information may not necessarily be required if all transactions execute properly, but errors are needed to be logged to understand why a transaction did not execute properly. For example, if an address of a request is corrupt, it should be logged when the transaction is not executed properly.

A method for recording and logging errors in a computer system includes reading first error handling information with respect to a transaction. The first error handling information is stored in a first component, and based upon a condition of the storage in the first component, an oldest error information is evicted from the first component.

A computer system for recording and logging error handling information includes a memory and a processor operatively coupled with and in communication with the memory and an endpoint component. The processor is configured to read first error handling information with respect to a transaction, store the first error handling information in a first component, and based upon a condition of the storage in the first component, evict an oldest error handling information from the first component.

A non-transitory computer-readable medium for recording and logging error handling information in a computer system having instructions recorded thereon, that when executed by the processor, cause the processor to perform operations. The operations include reading first error handling information with respect to a transaction. The first error handling information is stored in a first component, and based upon a condition of the storage in the first component, an oldest error information is evicted from the first component.

Figure 1:
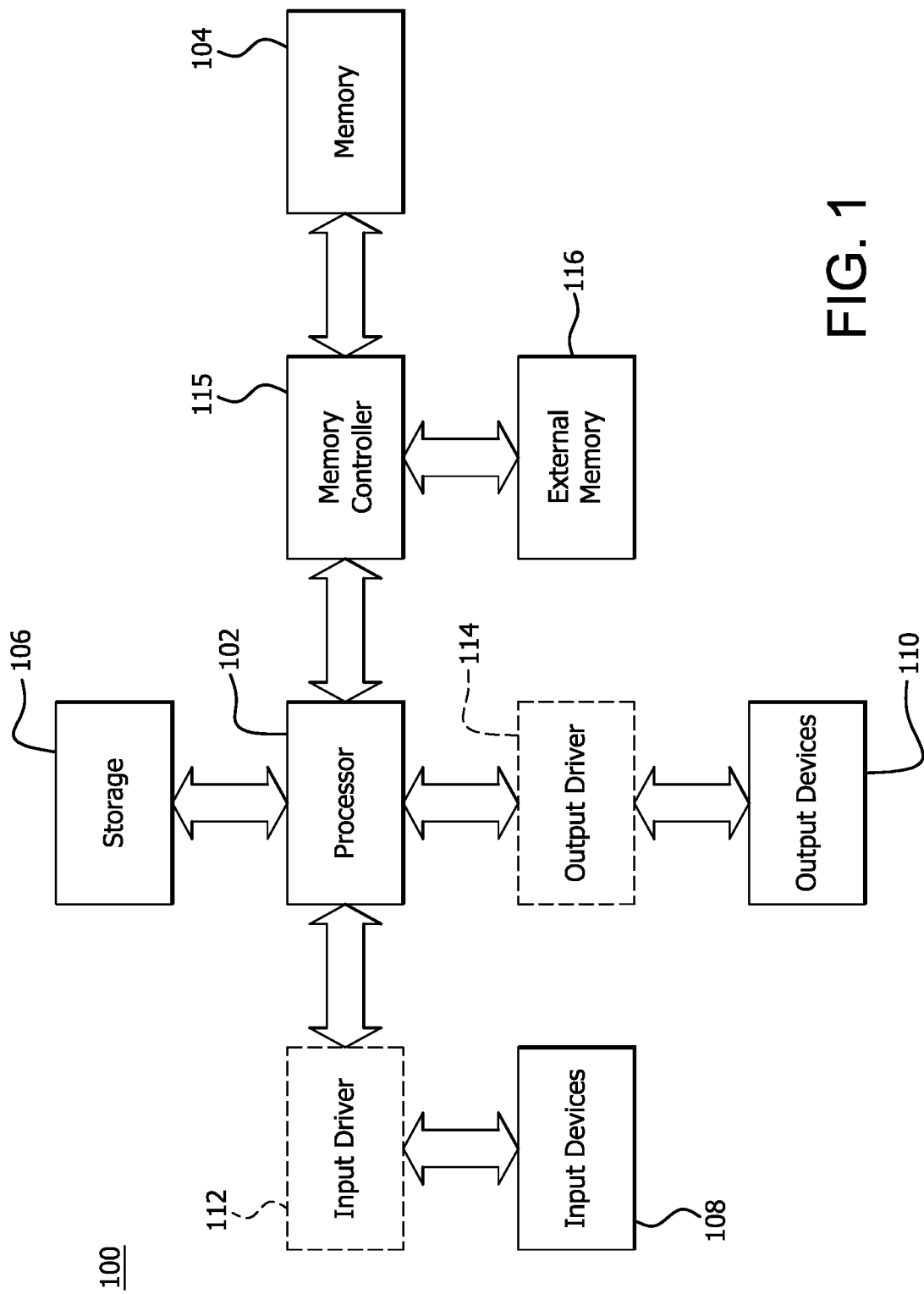
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a server, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. Additionally, the device 100 includes a memory controller 115 that communicates with the processor 102 and the memory 104, and also can communicate with an external memory 116. In some embodiments, memory controller 115 will be included within processor 102. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. Additionally, elements 108, 110, 112, and 114 may be included in a single I/O device/component.

The external memory 116 may be similar to the memory 104, and may reside in the form of off-chip memory. Additionally, the external memory may be memory resident in a server where the memory controller 115 communicates over a network interface to access the memory 116.

Figure 2:
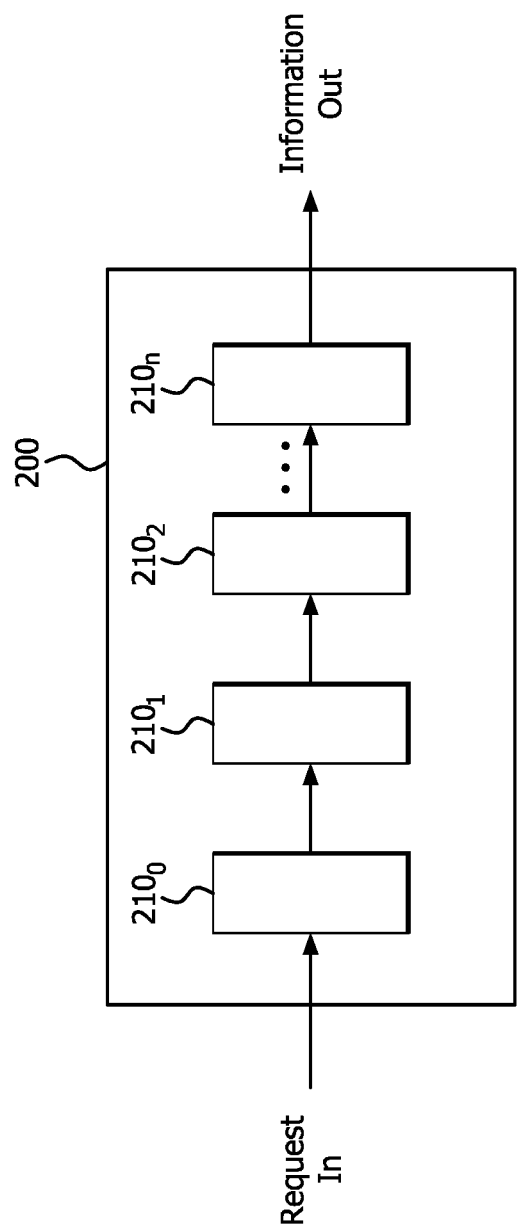
FIG. 2 is a block diagram of a FIFO in which one or more of the features of the disclosure can be implemented.

FIG. 2 is a block diagram of a first in/first out (FIFO) system 200 in which one or more of the features of the disclosure can be implemented. The FIFO system 200 includes a plurality of FIFOs 210 (designated $210_0$, $210_1$, $210_2$, . . . , $210_n$). Although further detail describing the method is described below, during a PCIe transaction, such as a read/write request, information is pushed into the first storage FIFO $211_0$. As additional transactions occur, information is pushed into subsequent FIFOs 211.

When all of the FIFOs 211 are full, and when an additional transaction occurs, the oldest information is pushed out of FIFO $211_n$ in order to make additional room in the FIFO system 210. Additionally, when a transaction completes, whether it has an error or not, the storage element that matches the completed transaction is evicted from the FIFO system 210 no matter where the information resides or in which FIFO 211.

In one embodiment, the FIFO system 200 described above is a collapsible FIFO system, where each newer element is shifted forward in the FIFOs 211 while older elements are pushed toward eviction. Additionally, the FIFO system 200 may reside with each I/O device in system 100. That is, it may reside within a processor PCIe root port that connects to each I/O device.

Figure 3:
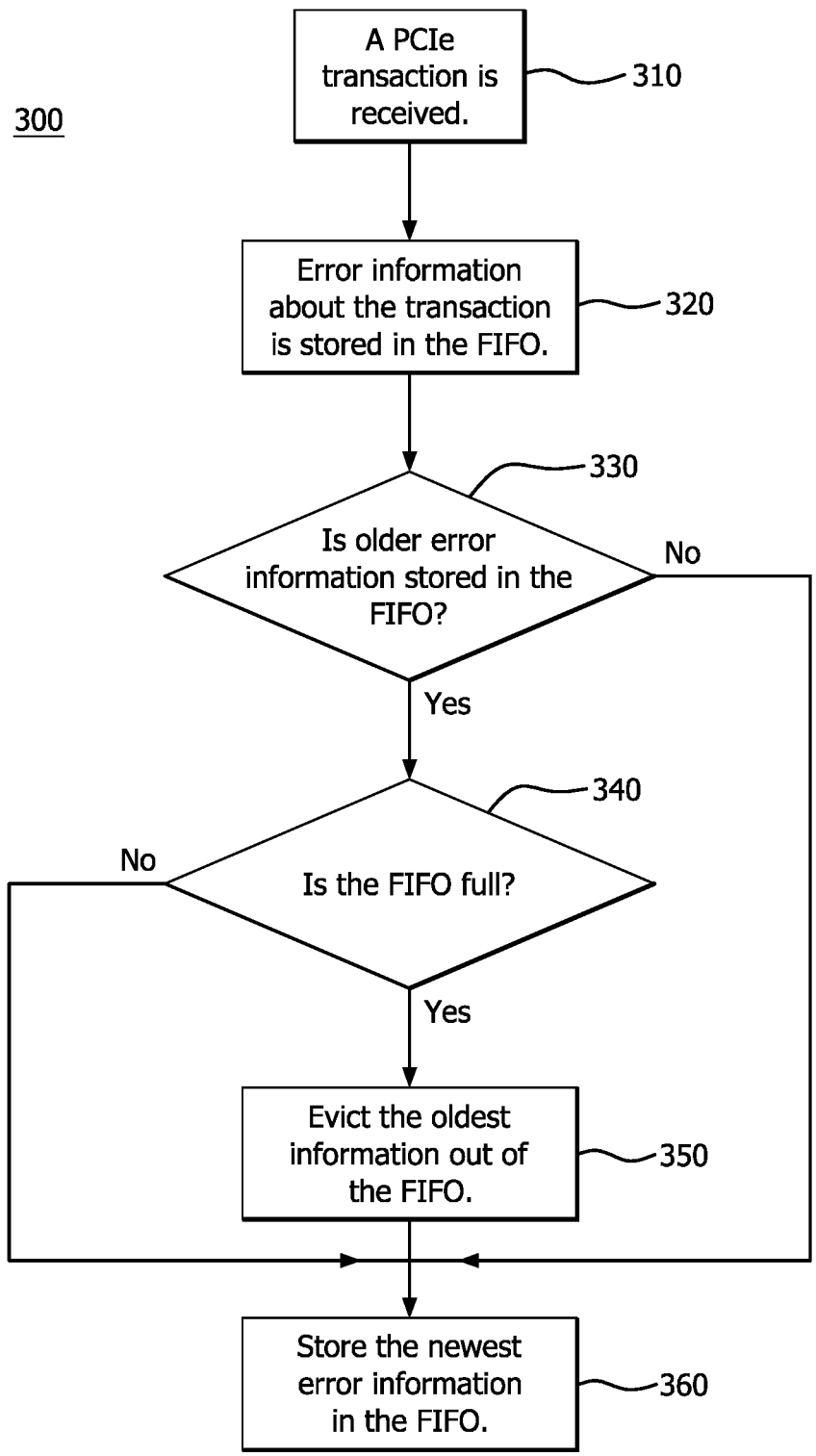
FIG. 3 is a flow diagram of an example method of recording and logging error handling information.

FIG. 3 is a flow diagram of an example method 300 of recording and logging errors. In step 310, a PCIe transaction is received. The transaction may come from one or more PCIe component devices connected to the system 100.

In step 320, error information about the transaction is stored in the FIFO device 210. Generally, full or typical error handling information is initially kept for active/in-flight transactions, with the error handling information being incrementally and gradually reduced in resolution or complexity as the active/in-flight transactions age (possibly for certain subsets of transactions). For example, error handling information that is less critical for, or likely to be dispositive for identifying errors, can include the full error handling information for younger transactions. For example, the address location of the request may be fully stored, or a tag that points to the address location may be stored.

For example, full error handling information may include all of the information required to generate a full fidelity advanced error reporting (AER) header and prefix log. Lower fidelity error logs may omit some information such as the address, transaction tag, attributes, and prefixes for example.

In step 330, it is determined whether or not older error information is stored in the FIFO. That is, if information has already been pushed into the memory areas of the FIFO is determined. If older information is stored in the FIFO (step 330), then based on whether or not that FIFO is full (step 340), the oldest error information is evicted from that FIFO (step 360).

The newest error information is then stored in that FIFO (step 360). For example, the first FIFO $210_0$ may contain high resolution error handling information for handling an error. An entry evicted from this FIFO is then stored in the second FIFO $210_1$ which may record a lower amount of resolution of error handling information.

To implement the method 300, the error information recording circuitry in the FIFO system 210 may include a hierarchy of tables (or other records), with a first table including a set of N entries (where N=24, 32, or a different number) that are used for storing full error handling information for the N youngest transactions (e.g., the most recently transmitted transactions). A second table in the hierarchy of tables includes M entries (where M=56, 128, or a different number) that are used for storing reduced error handling information. That is, after step 350, as information is evicted out of the FIFO $210_0$, for example, the reduced error handling information is stored in a second table which may reside in FIFO $210_1$.

For example, assuming that the error handling information includes header information associated with the transaction, the reduced error handling information may include fewer header fields. That is, it may lack one or more header fields than the full error handling information. A third table and subsequent tables in the hierarchy can also include sets of entries in which incrementally less error handling information is stored.

The error handling information described above may be stored in a storage area in the FIFOs 210 as mentioned above, or the information may be stored in a separate location, with a pointer stored in the FIFOs 210 pointing to the memory location where the error handling information is stored.

Accordingly, the error handling information flows (or is bumped or pushed) from table to table as the respective transactions age. For example, full or typical error handling information can be initially recorded for a transaction, such as by recording the full or typical error handling information in the first table in the hierarchy of tables. As time progresses, the full or typical information for the transaction gets evicted from the first table, such as by becoming old enough and/or being removed to free space for writing error handling information for younger transactions to the first table.

When evicted from the first table, the error handling information is reduced (e.g., specified fields, portions, etc. are dropped) and then stored in an entry in the second table in the hierarchy of tables. Because the second and lower tables in the hierarchy of tables store less error handling information for transactions, the tables can be smaller in semiconductor layout area and can consume less electrical power.

Although some error handling information is discarded or lost in the lower tables in the hierarchy, the error handling information that is discarded or lost can be selected so that error handling information that is more likely to be relevant remains in the lower tables in the hierarchy.

Depending on the error situation, an error may be detected quickly or the error may be detected further down in the transaction pipeline. That is, when a processor (e.g., processor 102) receives a series of memory read transactions from an I/O device, it records the error handling information for each transaction while the memory read is processed. Some error types may be detected quickly, such as a malformed transaction layer packet (TLP) error, while other errors may be detected further down the pipeline (e.g., an abort due to address translation errors). Additionally, other errors or determinations of a successful transaction, require the processor to fetch the data from memory. For example, a memory failure might result in an abort error.

Additionally, transactions where the transaction occurs off the PCIe bus may take longer to detect. In those cases, it may be desirable to log less detailed error information, (e.g., the first 64 transactions of error info).

In those cases the error type and address may be logged without the full header log, or as described above a lower level of error information may be stored in the hierarchy of tables. In one example, the header for those error transactions can be reduced, (e.g., populated with a single bit in the header). Alternatively, the entire header, up to 32 bytes (header and prefix) may be logged.

Although the above method is described as relevant to error logging on the PCIe bus, it is noted that any endpoint function and component can utilize the above method. For example, the above method could be utilized in a root port or a switch port. Additional actions may also be utilized with respect to the error logging. For example, the actions may include undertaking RAS actions, such as, for example, notifying the system or platform firmware.

The methods provided can be implemented in a general purpose computer, a processor, or a processor core. Suitable processors include, by way of example, a general purpose processor, a purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure. Further, although the methods and apparatus described above are described in the context of controlling and configuring PCIe links and ports, the methods and apparatus may be utilized in any interconnect protocol where link width is negotiated.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). For example, the methods described above may be implemented in the processor 102 or on any other processor in the computer system 100.

What is claimed is:

1. A method for recording and logging error handling information in a computer system, comprising:

reading first error handling information with respect to a transaction;

storing the first error handling information in a first component; and based on a condition that the storage capacity of the first component being full, evicting an older error handling information from the first component to a second component in communication with the first component, wherein the error handling information stored in the second component is a reduced amount of error handling information than the error handling information stored in the first component.

2. The method of claim 1 wherein the error handling information stored in the second component includes a reduced amount of header fields stored as error handling information.

3. The method of claim 1, further comprising evicting the older error handling information from the first component upon an indication of completion of the transaction associated with the older error handling information.

4. The method of claim 1 wherein the first component includes a first table that stores a first type of error handling information.

5. The method of claim 4 wherein the first type of error handling information includes address information, transaction tag information, attribute information, and prefix information.

6. The method of claim 4 wherein the first type of information includes a pointer stored in the first component associated with a second type of information that includes address information, transaction tag information, attribute information, and prefix information.

7. The method of claim 4 wherein the second component includes a second table that stores a second type of error handling information that includes reduced information than the first type of error handling information.

8. A computer system for recording and logging error handling information, comprising:

a memory; and a processor operatively coupled with and in communication with the memory and an endpoint component, the processor configured to:

read first error handling information with respect to a transaction;

store the first error handling information in a first component; and based on a condition that the storage capacity of the first component being full, evict an older error handling information from the first component to a second component in communication with the first component, wherein the error handling information stored in the second component is a reduced amount of error handling information than the error handling information stored in the first component.

9. The computer system of claim 8 wherein the error handling information stored in the second component includes a reduced amount of header fields stored as error handling information.

10. The computer system of claim 8, further comprising evicting the older error handling information from the first component upon an indication of completion of the transaction associated with the older error handling information.

11. The computer system of claim 8 wherein the first component includes a first table that stores a first type of error handling information and the second component includes a second table that stores a second type of error handling information that includes reduced information than the first type of error handling information.

12. The computer system of claim 8 wherein the first component is a first in/first out (FIFO) component.

13. The computer system of claim 8 wherein the endpoint component is a peripheral component interconnect express (PCIe) component.

14. A non-transitory computer-readable medium for recording and logging error handling information in a computer system, the non-transitory computer-readable medium having instructions recorded thereon, that when executed by a processor, cause the processor to perform operations including:
   reading first error handling information with respect to a transaction;
   storing the first error handling information in a first component; and
   based on a condition that the storage capacity of the first component being full, evicting an older error handling information from the first component to a second component in communication with the first component, wherein the error handling information stored in the second component is a reduced amount of error handling information than the error handling information stored in the first component.

* * * * *